Jan. 26, 1954     H. H. MILLER     2,666,946
THREE POSITION HINGE FOR COOKING APPLIANCES
Filed Nov. 10, 1950
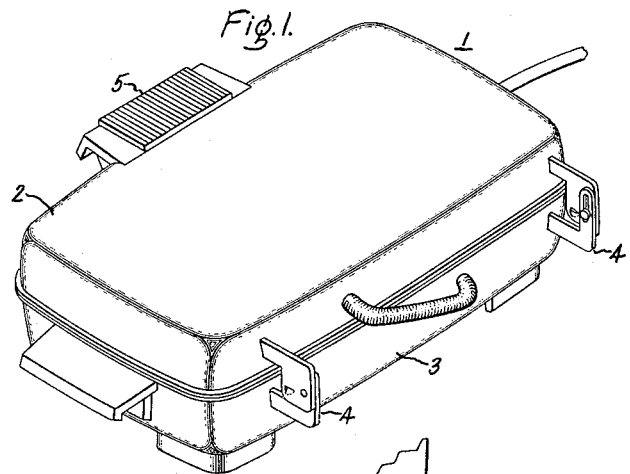
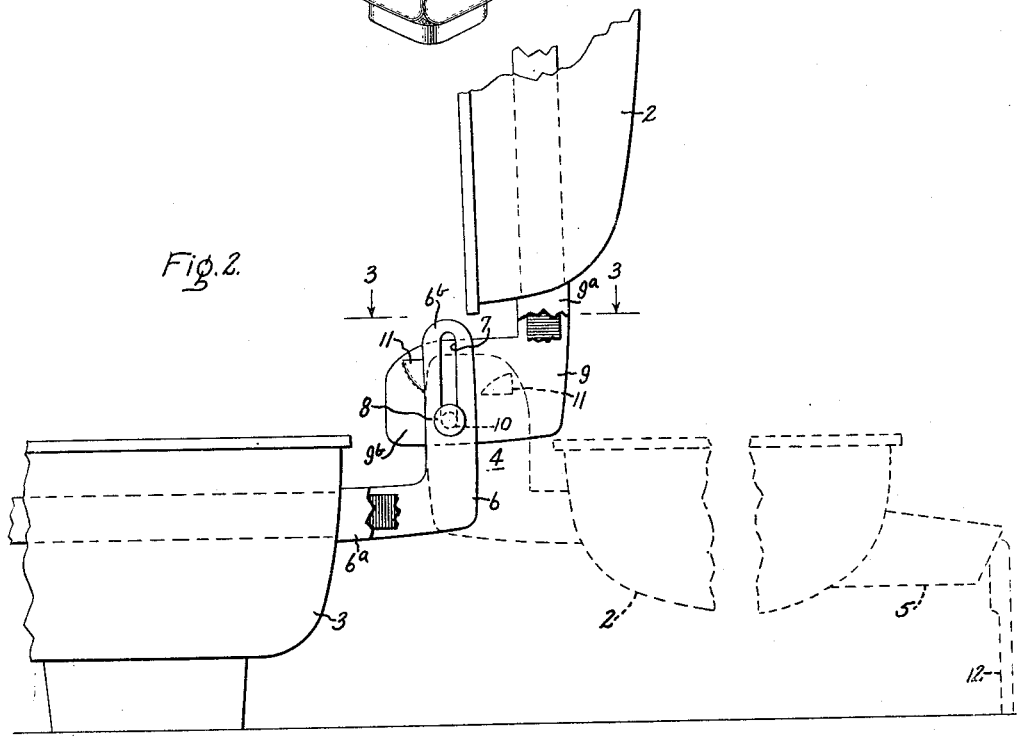
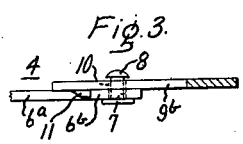
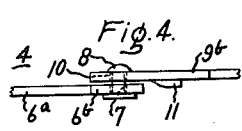
Inventor:
Homer H. Miller,
by
His Attorney.

Patented Jan. 26, 1954

2,666,946

UNITED STATES PATENT OFFICE 2,666,946

THREE POSITION HINGE FOR COOKING APPLIANCES

Homer H. Miller, Bridgeport, Conn., assignor to General Electric Company, a corporation of New York Application November 10, 1950, Serial No. 195,028

2 Claims. (Cl. 16—179)

This invention relates to cooking appliances having upper and lower heat producing members, and more particularly to the hinge means used to pivotally connect together the two members of such an appliance, as, for example, a combination sandwich grill and waffle iron.

Hinges used in sandwich grills and waffle irons, and in combinations of the two, are of necessity the expansion type to allow food to be placed between the two members of the device for cooking. For widest application, the hinges must also permit the upper heating member or lid of the device to be pivoted through an angle of substantially 180° so that the cooking surface thereof is turned upward. By turning the cooking surface of the lid upward, twice the cooking surface is available for frying eggs, cooking pancakes, or the like. However, for applications such as grilling sandwiches or cooking waffles where the food is heated between the upper and lower members, means for limiting the pivotal motion of the lid to approximately 90° and means for holding it open in that raised position are desirable. By placing the lid in the raised position, the person using the appliance has both hands free to place the food on the lower member, where if it were necessary to hold the lid open, he would only have one hand for inserting the food.

It is the object, therefore, of this invention to provide for use on cooking appliances a new and improved hinge assembly having the above-mentioned desirable characteristics.

The hinge assemblies provided by this invention are commonly used two to an appliance, although three or more can be employed, if desired. Each assembly has a hinge bracket attached to the upper heating member or lid of the appliance and a hinge bracket attached to the lower heating member of the appliance. The upper hinge bracket is pivotally connected to the lower hinge bracket by a pin which rides in a vertical slot in an end portion of one of the hinge brackets. The necessary expansion feature is accomplished by thus permitting relative motion between the upper and lower hinge brackets. The upper bracket is provided with a raised projection having a sloping surface. The edge of the raised projection strikes the edge of the lower hinge bracket when the upper hinge member has been pivoted slightly over 90°. This contact stops the movement of the lid and supports it in that position. When it is desired to pivot the lid still further, i e., open it fully so that the heating surface is turned upward, the lid is lifted, the pin riding in the vertical slot, until the raised projection of the upper hinge bracket clears the lower hinge bracket. Once the projection clears, the lid can be pivoted to the fully open position. As the upper hinge bracket pivots, the raised projection moves over the top of the rounded end portion of the lower hinge bracket until it clears the opposite edge from that which it originally struck; then the lid can be lowered until its heating surface is on substantially the same plane as that of the lower heating member. When the lid is moved back to the closed position, the curved or sloping surface of the raised projection cams the projection past the lower hinge bracket, thus eliminating the need for lifting the lid in closing the grill.

For a more complete knowledge of my invention, together with additional objects and advantages thereof, reference should now be had to the following specification and to the accompanying drawing in which:

Fig. 1 is a perspective view of a sandwich grill embodying the hinge assembly of this invention; Fig. 2 is a side elevation showing the grill with the lid in the raised position and in the fully open position; Fig. 3 is a sectional view taken on the line 3—3 of Fig. 2 showing the hinge assembly in the raised position; and Fig. 4 is a sectional view showing the hinge assembly in the fully open position.

Referring to Fig. 1, a sandwich grill 1 has an upper heating member or lid 2 mounted on a lower heating member 3 by a pair of hinge assemblies 4. The hinge assemblies 4 allow lid 2 to be pivotally raised by means of handle 5, which is made of heat insulating material. The structure of handle 5 may be of a form as covered by my copending application, Serial No. 143,729, filed Februray 11, 1950, now Patent No 2,641,994, dated June 16, 1953, and assigned to the same assignee as the present invention.

In Fig. 2, which is a side view, sandwich grill 1 as shown in the raised position, and by dotted lines in the fully open position. An L shaped lower hinge bracket 6 of hinge assembly 4 has a support portion 6a attached securely to lower heating member 3 by means not shown, and a vertically extending portion 6b which contains a vertical slot 7. Extending through slot 7 is a rivet 8.

The upper hinge bracket 9 is also basically L shaped, having a support portion 9a firmly attached to lid 2 by means not shown, and an end portion 9b containing a hole 10, through which rivet 8 extends. Rivet 8 is flanged at both ends, the distance between flanges, however, being slightly greater than the combined width of hinge brackets 6 and 9 to allow a slight transverse play between the hinge brackets for a purpose which will appear hereinafter. On its side adjacent bracket 6, the end portion 9b of bracket 9 is provided with a raised projection 11 which has a sloped surface. This sloped or curved surface ends in an outstanding edge or face extending outwardly from the bracket surface at a substantial angle thereto. When the lid is in the closed position, this outstanding edge comprises the uppermost edge of projection 11, whereas when the lid is in the open position, it comprises the bottom edge of the projection. In order to form the raised projection having a curved surface terminating in an outstanding or projecting edge, various methods may be employed, a lancing operation being but one example of a number of suitable processes.

Lid 2 is moved to the raised and fully open positions by lifting handle 5. When the lid is in the open position, a supporting member 12 included in handle 5 may be used to support it.

Now, assuming lid 2 to be in a closed position, then as handle 5 is lifted, upper hinge bracket 9 pivots on rivet 8 until the projecting edge of the raised projection 11 strikes the edge of the vertically extending portion 6b of lower hinge bracket 6. This contact occurs when the lid 2 has moved slightly more than 90° from the closed position, and the lid 2 has thereby passed the point of balance. If the lifting force is then removed, the lid 2 will remain in the raised position because the force of gravity is now trying to open the lid still further and is prevented from doing so by the contact between projection 11 and hinge portion 6b. The contact between the outstanding edge of projection 11 and the edge of hinge portion 6b is clearly shown in Fig. 3. If it is desired to fully open lid 2 for such applications as were hereinbefore mentioned, lid 2 is lifted vertically upward by means of handle 5 until raised projection 11 clears the rounded end of hinge portion 6b, rivet 8 running upward in slot 7. Then, as hinge 9 pivots on rivet 8, raised projection 11 moves over the top of hinge portion 6b until it clears the opposite edge of hinge portion 6b from that which it originally struck. Moreover, the curved or sloping surface of projection 11 is now adjacent this opposite edge of hinge portion 6b, rather than the sharp edge of projection 11 which first struck the hinge portion 6b. Once projection 11 passes over hinge 6, lid 2 is lowered into the fully opened position, substantially 180° displaced from the original closed position. This is shown by the dotted lines in Fig. 2. As previously mentioned, supporting member 12 of handle 5 forms the support other than hinge assemblies 4 necessary to hold lid 2 in the fully open position.

The lifting necessary to clear projection 11 from hinge bracket 6 as lid 2 is fully opened is not required to close lid 2 from that position. As handle 5 is moved, and hinge bracket 9 pivots on rivet 8, the raised projection 11 is cammed by means of the sloping surface thereof past lower hinge portion 6b. The transverse play, beyond that provided by rivet 8, necessary for projection 11 to pass hinge portion 6b is provided by the springing of hinge brackets 6 and 9. Fig. 4, by showing clearly the amount of transverse play provided by rivet 8, infers the amount of play which must be provided by the springing of hinge brackets 6 and 9.

It will be seen from the above description that this invention provides a new and improved hinge assembly for electrical cooking appliances, which not only has the characteristics desirable, but also is sturdy in construction, simple in manufacture, and inexpensive in cost.

Although in accordance with the provisions of the patent statutes, this invention is described as embodied in concrete form and the principle thereof has been explained together with the best mode in which it is now contemplated applying that principle, it will be understood that the elements shown and described are merely illustrative and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A hinge for use with a cooking appliance having upper and lower heating members, said hinge comprising a hinge bracket adapted to be secured on the lower heating member and having a vertically extending edge on one side thereof, a hinge bracket adapted to be secured on the upper heating member which overlaps the first named hinge bracket, a pivot pin connecting said brackets, a projection on the second named hinge bracket having a flat edge for engagement with said vertically extending edge for holding the upper heating member in an upright position with respect to the lower heating member, said projection also having a sloping outer surface, one of said brackets having a slot in which said pivot pin is located of a length to permit the upper heating member to be raised with respect to the lower heating member by an amount to bring said projection beyond the upper end of the hinge bracket on the lower heating member whereby the upper heating member may be positioned in co-planar relation with respect to the lower heating member with said projection on the other side of the hinge bracket on the lower heating member, said pivot pin connection together with the resiliency of said hinge brackets providing transverse side play sufficient to permit of the swinging of the upper heating member from such co-planar position by forcing said projection past said first-named hinge bracket.

2. A hinge for use with a cooking appliance having upper and lower heating members, said hinge comprising an L-shaped hinge bracket adapted to be secured on the lower heating member and having a vertically extending portion with a vertically extending edge, a hinge bracket adapted to be secured on the upper heating member which overlaps the first named hinge bracket, a pivot pin connecting said brackets, a projection on the second named hinge bracket having a flat edge for engagement with said vertically extending edge for holding the upper heating member in an upright position with respect to the lower heating member, said projection also having a sloping outer surface, the vertically extending portion of said L-shaped bracket having a slot in which said pivot pin is located of a length to permit the upper heating member to be raised with respect to the lower heating member by an amount to bring said projection beyond the upper end of such portion whereby the upper heating member may be positioned in co-planar relation with respect to the lower heating member with said projection on the side of such portion opposite to said vertically extending edge, said pivot pin connection together with the resiliency of said hinge brackets providing transverse side play sufficient to permit of the swinging of the upper heating member from such co-planar position by forcing said projection past said first-named hinge bracket.

HOMER H. MILLER.

References Cited in the file of this patent

UNITED STATES PATENTS

| Number | Name | Date |
|---|---|---|
| 126,850 | Stiger | May 14, 1872 |
| 824,578 | Patten | June 26, 1906 |
| 1,192,161 | Bowser | July 25, 1916 |
| 2,146,171 | Burch | Feb. 7, 1939 |
| 2,146,172 | Burch | Feb. 7, 1939 |
| 2,161,446 | Barnes | June 6, 1939 |
| 2,209,677 | Flamm | July 30, 1940 |
| 2,478,529 | Farr et al. | Aug. 9, 1949 |